US006069712A

United States Patent [19]
Dellert et al.

[11] Patent Number: 6,069,712
[45] Date of Patent: May 30, 2000

[54] IMAGE HANDLING METHOD AND SYSTEM INCORPORATING CODED INSTRUCTIONS

[75] Inventors: David William Dellert, Fairport; Carl Joseph Tesavis, Spencerport, both of N.Y.

[73] Assignee: Eastman Kodak Company, Rochester, N.Y.

[21] Appl. No.: 08/792,612

[22] Filed: Jan. 31, 1997

[51] Int. Cl.⁷ .............................. H04N 1/00; H04N 1/32
[52] U.S. Cl. ........................................... 358/408; 358/442
[58] Field of Search .................................. 358/408, 402, 358/487, 442, 527, 403, 452, 453, 474; 396/319; 395/200.48, 107.01

[56] References Cited

U.S. PATENT DOCUMENTS

| | | | |
|---|---|---|---|
| 4,508,438 | 4/1985 | Kanaoka et al. | 354/105 |
| 4,519,701 | 5/1985 | Kanaoka et al. | 355/39 |
| 4,574,692 | 3/1986 | Wahli | 101/2 |
| 4,607,949 | 8/1986 | Hakamada et al. | 355/40 |
| 4,671,648 | 6/1987 | Watanabe et al. | 355/40 |
| 4,694,354 | 9/1987 | Tanaka et al. | 358/296 |
| 4,705,391 | 11/1987 | Peeters et al. | 355/77 |
| 4,746,207 | 5/1988 | Selin | 352/90 |
| 4,760,428 | 7/1988 | Watanabe et al. | 355/40 |
| 4,760,547 | 7/1988 | Budworth et al. | 371/5 |
| 4,779,122 | 10/1988 | Signoretto | 355/77 |
| 4,823,162 | 4/1989 | Renn et al. | 355/40 |
| 4,862,200 | 8/1989 | Hicks | 354/75 |
| 4,929,972 | 5/1990 | Anderson et al. | 354/75 |
| 4,937,615 | 6/1990 | Tokuda | 355/35 |
| 5,086,310 | 2/1992 | Iwashita et al. | 354/75 |
| 5,097,278 | 3/1992 | Tamamura et al. | 354/105 |
| 5,126,540 | 6/1992 | Kashiqagi et al. | 235/375 |
| 5,132,992 | 7/1992 | Yurt et al. | 375/122 |
| 5,151,726 | 9/1992 | Iwashita et al. | 354/75 |
| 5,159,385 | 10/1992 | Imamura | 355/28 |
| 5,160,952 | 11/1992 | Iwashita et al. | 354/76 |
| 5,168,303 | 12/1992 | Ikenoue et al. | 355/38 |
| 5,187,518 | 2/1993 | Kitagawa | 355/40 |
| 5,231,451 | 7/1993 | Uekusa et al. | 355/29 |

(List continued on next page.)

FOREIGN PATENT DOCUMENTS

| | | | |
|---|---|---|---|
| 475 447 | 3/1992 | European Pat. Off. | G03B 17/24 |
| 503 391 | 9/1992 | European Pat. Off. | G03C 11/02 |
| 532 047 | 3/1993 | European Pat. Off. | G03B 27/80 |
| 3 664-630 | 12/1986 | Germany | G03B 27/73 |
| 3-223 736 | 10/1991 | Japan | G03B 17/24 |
| 3-223 737 | 10/1991 | Japan | G03B 17/24 |
| 3-231 730 | 10/1991 | Japan | G03B 17/24 |
| 404 070 731 | 3/1992 | Japan | G03B 17/24 |
| 4-204 734 | 7/1992 | Japan | G03D 15/10 |
| 4-273238 | 9/1992 | Japan | G03C 1/00 |
| 5-127271 | 5/1993 | Japan | G03B 27/72 |

OTHER PUBLICATIONS

"Picture Web Preview" Aug. 28, 1996, 16 pages from http:/www.pictureweb.com/ and http://www.pictureplace.com/.

*Primary Examiner*—Leo H. Boudreau
*Assistant Examiner*—Shawn B. Cage
*Attorney, Agent, or Firm*—James D. Leimbach

[57] ABSTRACT

System components provide for a method of: processing an exposed photographic film at a processor-scanner station which has both a scanner and a processor at the same location, to produce one or more hardcopy images at the processor-scanner location; reading data on the film which indicates that a set of one or more of the hardcopy images, is to be communicated to a hub station, which hub station is remote from the processor-scanner station; scanning the set at the same processor-scanner location at which the film was processed, to obtain a corresponding image set signal; communicating the image set signal from the scanner to the hub station; and storing the communicated image set signal at the hub station.

12 Claims, 4 Drawing Sheets

U.S. PATENT DOCUMENTS

| | | | |
|---|---|---|---|
| 5,237,156 | 8/1993 | Konishi et al. | 235/375 |
| 5,255,031 | 10/1993 | Ikenoue | 354/106 |
| 5,264,683 | 11/1993 | Yoshikawa | 235/375 |
| 5,272,549 | 12/1993 | McDonald | 358/527 |
| 5,274,418 | 12/1993 | Kazami et al. | 355/40 |
| 5,281,993 | 1/1994 | Croshetierre et al. | 355/40 |
| 5,307,100 | 4/1994 | Kubo | 354/105 |
| 5,319,401 | 6/1994 | Hicks | 354/76 |
| 5,327,265 | 7/1994 | McDonald | 358/527 |
| 5,344,730 | 9/1994 | Kitamoto | 430/14 |
| 5,347,403 | 9/1994 | Uekusa | 360/3 |
| 5,353,078 | 10/1994 | Aoshima | 354/105 |
| 5,382,508 | 1/1995 | Ikenoue | 430/496 |
| 5,383,027 | 1/1995 | Harvey et al. | 358/296 |
| 5,404,196 | 4/1995 | Terashita et al. | 355/77 |
| 5,428,423 | 6/1995 | Clark | 355/77 |
| 5,428,747 | 6/1995 | Itoh et al. | 354/106 |
| 5,467,168 | 11/1995 | Kinjo et al. | 355/77 |
| 5,471,265 | 11/1995 | Shibata et al. | 354/76 |
| 5,477,353 | 12/1995 | Yamasaki | 358/487 |
| 5,479,228 | 12/1995 | Tamamura et al. | 354/106 |
| 5,493,408 | 2/1996 | Kurogane et al. | 254/296 |
| 5,502,527 | 3/1996 | Kazami et al. | 354/106 |
| 5,561,531 | 10/1996 | Funazaki et al. | 386/95 |
| 5,666,215 | 9/1997 | Fredlind et al. | 358/487 |
| 5,703,701 | 12/1997 | Yamamoto et al. | 358/487 |
| 5,760,917 | 6/1998 | Sheridan | 358/442 |
| 5,799,219 | 8/1998 | Moghadam et al. | 396/319 |

IMAGE HANDLING METHOD AND SYSTEM INCORPORATING CODED INSTRUCTIONS

FIELD OF THE INVENTION

This invention relates generally to the field of photography and image signals obtained from photographs. More particularly, the present invention relates to a system and method by which image signals corresponding to hardcopy photographs, can be easily identified by a user for communication to a hub station, and retrieved and distributed as desired by a user.

BACKGROUND OF THE INVENTION

In conventional photography, a user exposes a photographic film in a camera and conveys (either personally, by mail, or some other delivery service) the exposed film to any convenient processing center. The processing center then processes the film to form the hardcopy images (typically in the form of photographic negatives on the original film and/or photographic prints, or photographic positives in the case of reversal processed film). The hardcopy images are then conveyed back to the user (often by the user personally picking them up at the processing center). If a user desires to share the images with others without giving up their own hardcopies, they typically go through the highly tedious and time consuming effort of designating which hardcopy images are desired to be shared, returning the designated hardcopy images to the processor to produce further hardcopies, and conveying the further hardcopies to the person(s) with whom they wish to share. If later it is desired to share the images with other persons, the same process must typically be repeated. In fact, so much effort and time is required that most users will simply not bother with multiple image sharing.

It has been appreciated that users can conveniently distribute multiple image copies in little time, by scanning the hardcopy image on a home scanner to generate corresponding digital image signals, and then forwarding one or more copies of the digital image signal to others by means of electronic mail (such as over the Internet). Furthermore, the recent advent of services such as KODAK PICTURE DISK available from Eastman Kodak Company and many film processors, which allows a user to obtain a digital image signal of images of processed film on a disk for a modest price, even eliminates the need for the user to own a scanner. The availability of a digital image signal additionally allows a user to conveniently store, manipulate, and display or print copies of the images as desired at the user's location using conventional computer equipment.

U.S. Pat. No. 5,272,549 discloses a system in which a customer can connect his computer to a remote print or copy center to retrieve digital image signals of the customer's images. Those digital image signals are described as having been obtained on a scanner at the customer's location with the storage media then being shipped to the print or copy center, or obtained on a scanner at the remote print or copy center. Presumably, any media scanned at the copy center is identified by a manually entered identification for a particular customer so that customer can later retrieve them. Similarly, subsequent U.S. Pat. No. 5,477,353 describes a system in which one or more photographer units can connect to a centralized laboratory unit (containing a film processor, scanner, and printer). The '353 patent system is constructed with the purpose that a given user's films are processed and scanned at one central processing center, each assigned a unique identification code, and retrieved by that user at his remote terminal using the identification code. The retrieved images can then be manipulated by the user and printed at the central processing center. The customer identification is read off a magnetic tape which has been affixed to a film bag carrying the film, at the processing center. No instructions are provided in the magnetic tape since none are required in the system of the '353 patent.

The systems of the '549 or '353 patents, require that all digital image storage media (in the '549 patent) or hardcopy film (in the case of the '353 patent) carrying images from multiple users, must be conveyed to only one central processing center. This is inconvenient and may cause delays in such a system implemented on a country wide or worldwide basis.

It would be desirable to provide a method and system which allows a user to simply have an exposed film delivered to any convenient one of a number of locations, at which locations the film is processed and scanned, and which allows a user to access the resulting image signals from a remote terminal without having to keep track of which films were delivered to which location. It would further be desirable that such a method and system can be readily expanded into a a countrywide or worldwide system, without reliance on a single central processing station. It would still further be desirable if such a system can avoid requiring users to complete cumbersome forms with instructions on how such system should operate.

SUMMARY OF THE INVENTION

The present invention recognizes that a readily expandable system for processing and scanning film images, saving the scanned images at locations remote from the processor and scanner locations, and retrieving them from still other remote terminals (such as a user's home), can be provided. This is accomplished by utilizing multiple hub stations each of which can serve a respective plurality of processor-scanner stations, and from which hub stations remote terminals can retrieve stored images.

However, the present invention further recognizes that a given user will typically wish to retrieve stored image set signals primarily from the same remote terminal (for example, a terminal located at their home or office; this is referenced as the user's "primary remote terminal"). Given this, for a user to be able to rapidly access their stored images from their primary remote terminal, it is not enough that following processing and scanning, the corresponding image signal set is simply uploaded to any hub station chosen by the processor-scanner operator (who will most typically be a retail film processing outlet). If such a method was used, whenever the user attemped to later access a specific image set signal, they would have to either have kept track of which hub station that image set signal was sent to, or have one of the hub stations perform a search throughout all other hub stations for the specific image set signal. The first procedure is tedious since it involves one more piece of information which must be provided to, and kept by, the user. Further, even if the user keeps this information they will typically connect their primary remote terminal to a local hub station serving their geographic area and would then have to instruct the local hub to retrieve the particular image set signal from the identified hub station at which the image set signal is located. This is also tedious and time consuming. As to the second procedure (having one hub station search other hub stations), this is also tedious and can result in substantially increased network traffic between hub stations, as well as delays while other hub stations are being searched. Further, the present invention recognizes that users cannot be expected to keep track of which hub station serves their geographic location and have image signal sets communicated there, particularly given that hub stations may be added or deleted, or the geographic regions which they serve may be altered from time to time.

The present invention then, provides in one aspect, an image handling method comprising:

(a) processing an exposed photographic film at a processor-scanner station which has both a scanner and a processor at the same location, to produce one or more hardcopy images at the processor-scanner location;

(b) reading data on the film which indicates that a set of one or more hardcopy images is to be communicated to a hub station, which hub station is remote from the processor-scanner station;

(c) scanning the set at the same processor-scanner location at which the film was processed, to obtain a corresponding image set signal;

(d) communicating the image set signal from the scanner to the hub station; and (e) storing the communicated image set signal at the hub station.

In the above method, there may be a plurality of processor-scanner stations, each as described above, remote from one another as well as the hub station. In this case, exposed photographic film may be processed at each of the processor-scanner stations and data read from each film which indicates that each is to be communicated to the same hub station (which hub station is preferably also identified in the data) for storage. Further, a plurality of hub stations may be present also. In this case, a plurality of image set signals are communicated from respective ones of a set of scanners at a set of scanner-processor locations to a one hub station, and another plurality of image set signals are communicated from respective ones of a another set of scanners at a another set of scanner-processor locations to another hub station. This method can additionally include communicating an image set signal stored at the one hub station to another hub station.

The method also allows for the hub station to receive other data or instructions from the data stored on the film. In particular, in one aspect the hub station can store associated image set signals in any of a plurality of identified categories. In this case the data read on the film preferably additionally includes a category identification in which the scanned and communicated image set signal is to be stored. The image set signal is then communicated with the category identification, and the hub station stores the image set signal in the read category identification.

The present invention further provides image handling systems which can execute any of the methods of the present invention. A particular system comprises:

(a) a processor-scanner station having at the same location:
  a processor which can process exposed photographic film to produce one or more hardcopy images;
  a scanner system which can scan a set of one or more of the hardcopy images to obtain a corresponding image set signal;
  a data reader which can read data on the film which indicates that the hardcopy image set is to be communicated to a hub station identified in the data;
  a first communication means for communicating the image signal to the identified hub station;

(b) a hub station remote from the scanner station, comprising:
  a second communication means to receive the image set signal from the scanner system;
  a first storage to store the image set signal;
  a third communication means for transmitting the image set signal to any of a plurality of terminals remote from the hub and each of the processor-scanner stations; and (c) a plurality of terminals remote from the hub station and each of the scanner-processor stations, connected to communicate with the hub station.

In another aspect of the present invention, a photographic film is provided carrying machine readable code on the film. The code instructs a communication device to scan one or more processed images from the film to generate an image set signal, and to transmit the image set signal. Preferably, the code also carries an indication of the address to which the image set signal is to be transmitted.

The present invention conveniently allows a user to store on a film, instructions which identify which images on a film are to be scanned to obtain a corresponding image set signal, and which of the scanned images are to be communicated to a hub station remote from the processor-scanner station, as well as the hub station's address. The consumer simply provides such a film to a processor-scanner location, and the indicated images (designated as an image set) can be automatically scanned and the corresponding image set signal communicated to the correct hub station, in accordance with the method of the present invention. Further, the user can store on the film, category identification instructions, so that the communicated image set signal is sent to the hub station and automatically stored by it in the correct category identification. The category identification may, for example, be one or more sub-directories or album areas the user considers appropriate for respective captured images). The necessary instructions can be conveniently stored by the user using controls on suitable camera capable of recording on the film, or on a separate recording device on exposed or unexposed film, before or after processing. Further, a system with multiple remote processor-scanner stations and a remote hub station, can conveniently allow a user to deliver an exposed film to any convenient one of multiple locations, while allowing ready retrieval of scanned images at any remote user terminal without the user tracking the location to which each exposed film was delivered. The presence of a hub station allows a user to forward copies of the images or have other services for the images, consistently obtained from the same location without having to communicate with other vendors and without regard to the locations to which different films may have been delivered.

BRIEF DESCRIPTION OF THE DRAWINGS

To facilitate understanding, identical reference numerals have been used, where possible, to designate identical elements that are common to the figures.

EMBODIMENTS OF THE INVENTION

Figure 1:
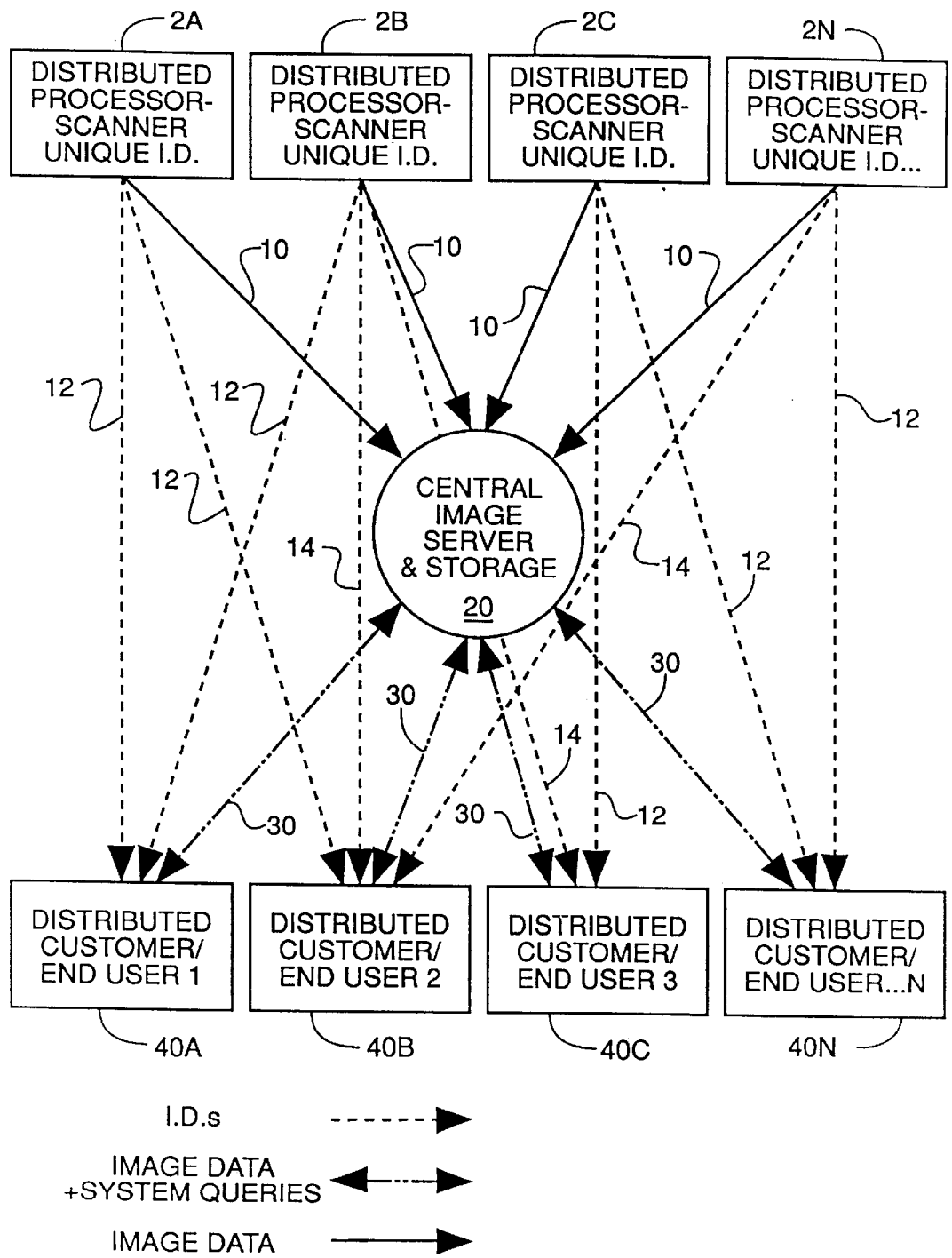
FIG. 1 is block diagram illustrating a system of the present invention.

In the present invention it will be understood that with reference to components being "remote" from one another, is meant that they will be at least in another building, and often a mile or more (such as 10, 100 or even 1000 miles) apart. A reference to "communication" refers, unless a contrary indication is given, to transfer of a signal. Such transfer can occur, for example, as a transmission of a signal between the sender and receiver, such as may be obtained over a computer network such as the Internet, dedicated communication line, or over a direct dial-up connection such as provided by a telephone line (any of which may include satellite or other non-wired links, in addition to wired and fiber optic links). Thus, "transmission" implies a signal transfer without a physical transfer of a storage means, such as by suitable "connection" (that is, an actual electronic communication link including a direct connection, such as over a telephone or an indirect connection as may occur over the Inernet). In any event, due to the distances typically encountered between processor-scanner stations, hub station and terminals, there will typically be one or more signal repeaters between the originator of the communication and the receiver. Alternatively, the transfer can occur by the signal being saved on a suitable storage medium (such as magnetic or optical tape or disks) and the storage medium being physically transferred followed by the reading of the signal from the hardcopy at the receiver. A reference to "forwarded" refers, unless a contrary indication is given, to a transfer of both a signal (that is, a "communication") as well as to other means of transfer, such as the physical transfer of a hardcopy (for example, a suitable medium upon which data, such as alphanumeric characters, corresponding to a signal has been printed). Additionally, a "camera" can include digital, film or video cameras. A camera typically includes a lens, a photosensitive element (such as a CCD in the case of an electronic camera) or a place to hold a photosensitive element (such as a silver halide film) to receive light from the lens, an optional illumination means (such as a flash), a user interface (which may just be manual or electronic shutter and other controls), and an electronic storage medium in the case of an elecronic camera (e.g. a solid state or magnetic storage such as in a digital camer), all contained in or on a single housing. A compartment or other means for holding a power supply (for example, batteries) in or on the camera is often also provided.

In the present invention reference is made to scanning of a hardcopy image to obtain a corresponding digital image. Such procedures and equipment for performing scanning, are well known. Typically, a film frame is scanned with a light beam, and the light transmitted through the film is detected, typically as three primary color light intensity signals, and digitized. The digitized values may be formatted to a standard for video display and stored on compact disc. magnetic media, or other suitable storage. Such image digitizers take a variety of forms and the various common aspects of film digitizing, particularly line illumination and linear CCD-based digitizers, are described in greater detail in U.S. Pat. No. 5,012,346. Also photographic prints can be digitized using reflection scanners.

Figure 2:
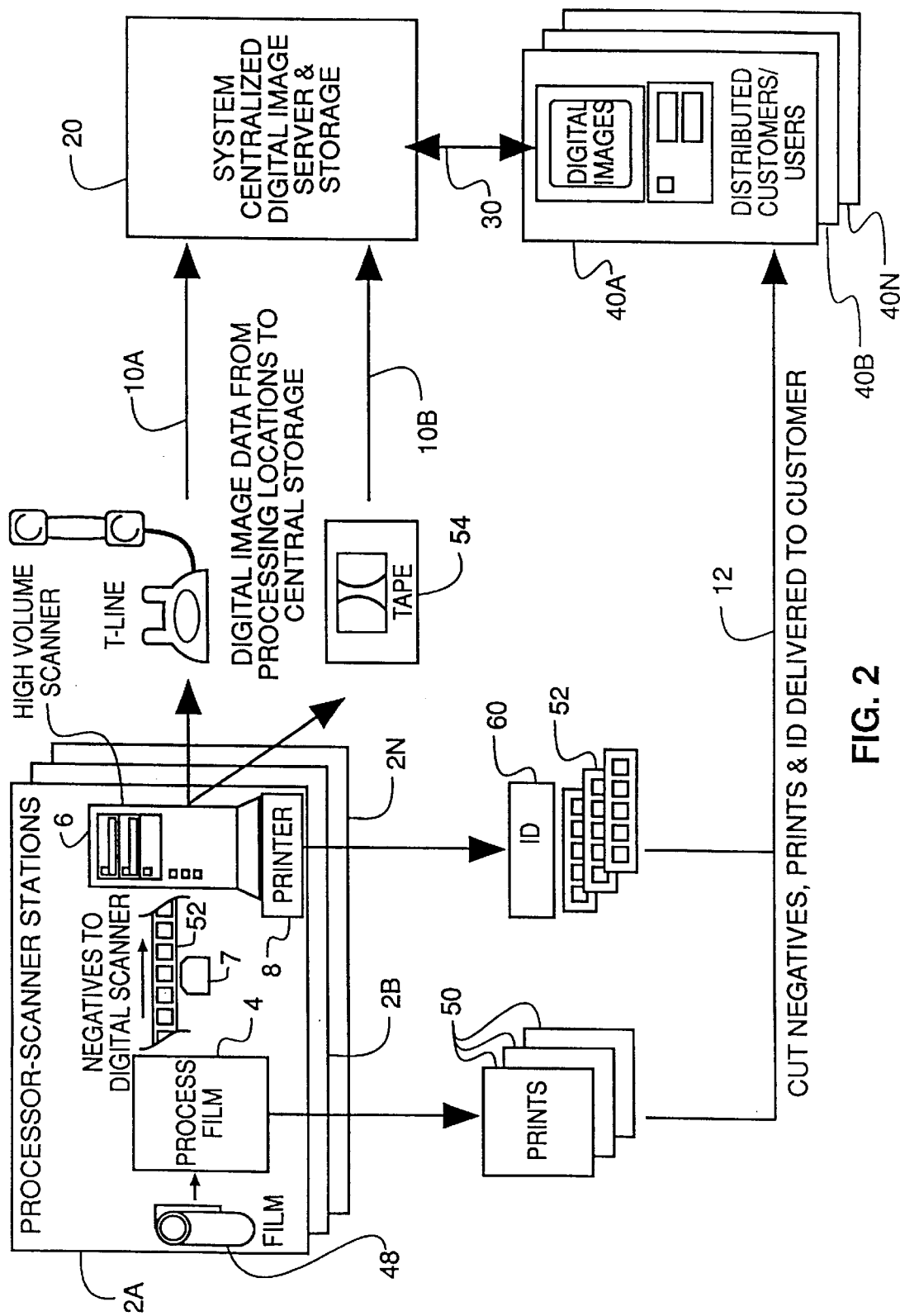
FIG. 2 is a data flow diagram illustrating the operation of some aspects of the system of FIG. 1.

Referring now to the drawings and particularly FIGS. 1 and 2, the illustrated embodiment of the image handling system of the present invention includes a plurality of processor-scanner stations 2A, 2B, 2C to 2N which are remote from one another, as best seen in FIG. 1. Each processor-scanner station includes a film processor 4 which can process exposed photographic film and produce hardcopy images in the form of both print sets 50 and corresponding negative sets 52 (only one of which is shown in FIG. 2). Negative image set 52 will typically be the developed negative film obtained from exposed film roll 48, while each print set 50 will typically be reflective prints of the negative set 52. However each set 50 and 52 can consist of one or more images.

Each one of the processor-scanner stations 2A to 2N has a data reader 7 which can read data on the film. Such data may be stored in various machine readable formats (e.g. optical or magnetic), but is preferably data stored in a magnetic layer. A suitable film and cameras for storing data magnetically on such a film are now widely available as Advanced Photo System ("APS") film and cameras. Also, suitable film, cameras and methods are described, for example, in U.S. Pat. No. 4,965,626, U.S. Pat. No. 4,965,627, U.S. Pat. No. 4,977,419, U.S. Pat. No. 5,021,820, U.S. Pat. No. 5,028,940, and U.S. Pat. No. 5,194,892. The data can include an indication as to which ones of the processed images from the film are to be scanned to produce corresponding image signals, and which of the image signals are to be communicated to a remote hub station. The data can further include a category identification for any one or more of the images indicating that they are to be stored in particular identified categories at a remote hub station 20. The category identification may include a user category (such as a user identification directing which user's name a particular image is to be stored under) as well as an album category (that is, a sub-directory or other linking to identify an image as belonging to a particular class of images as considered appropriate by the user). As well, an indication of the hub station's address can be contained in the data. Such indication may be direct, such as the hub station's geographical location (e.g. mailing address) or electronic mail address, or indirect, such as another address which can be related to the hub station address. For example, an indirect indication may be the user's address or postal code, which can then be related through a suitable database, such as may be located at the scanner-processor station (or a hub station, as described below), to the hub station geographically closest to the user's address. Note that the data may indicate that only some of the processed images are to be scanned and communicated to a hub station, and that different images can be directed to be communicated to different hub stations and/or different identified categories at a hub station.

Each processor-scanner station 2A to 2N further includes a high volume scanner system 6 which includes a suitable scanner for scanning the hardcopy images on each negative set 52 to obtain a corresponding digital image set signal. High volume scanner system 6 may be a digital computer in the form of a workstation or desktop computer equipped with a suitable digital scanner for scanning negative set 52. Additionally, each scanner system 6 can assign an associated identification signal to each image set signal so obtained. This assignment may be accomplished by suitable software running on scanner system 6, and is described further below. However, it will be noted at this point that each identification signal is unique in that it includes a scanner location identification which is unique for each processor-scanner station 2A to 2N.

Figure 3:
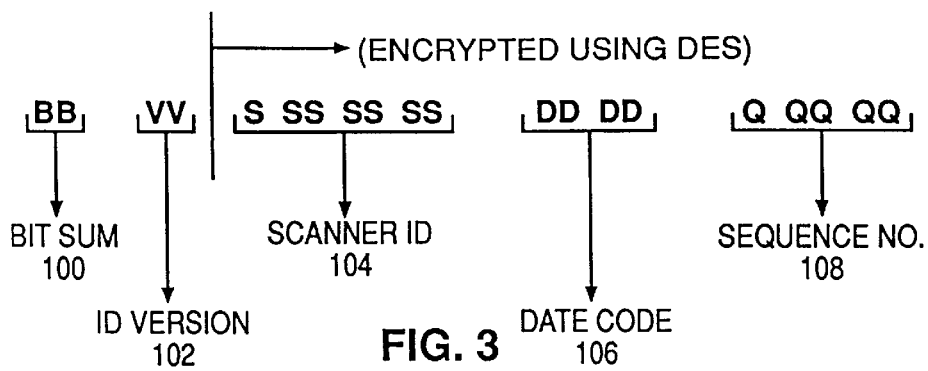
FIG. 3 is a diagram illustrating the components of an identification generated for an associated image set signal.

As to the details of the identification assigned to each associated image set signal, this is shown more fully in FIG. 3. The components of the assigned identification are as follows:

Bit Sum 100: the unsigned sum of the binary identification ("ID") data including ID version, Scanner ID, Date Code and Sequence Number (8 bits binary). The bit sum will be calculated after encryption but prior to conversion to the ASCII representation. The purpose of this Bit Sum is to identify data entry errors without querying the data base of a hub station 20 for an associated image set signal.

ID Version 102: revision number of this ID number (8 bits binary). This maps to the encryption key, a new version should accompany any change in the key.

Scanner ID 104, unique identifier for each processor-scanner station 2A to 2N (28 bits binary), which therefore serves as the scanner location identification.

Date Code 106, date a scan of a hardcopy image set began on (16 bits binary—9 bits for day of year and 7 bits for year). Year 0 will be any year in which the system of FIGS. 1 and 2 is first activated.

Sequence Number 108, incremented for each roll scanned within a day (20 bits binary).

The actual ID signal will be created from the binary representation of the Bit Sum 100, ID Version 102, Scanner ID 104, Date Code 106 and Sequence Number 108 as shown below in FIG. 3 (note that the ID Version 102 and Bit Sum 100 must not be encrypted):

The ID, minus the Bit Sum 100 and ID Version 102, will be encrypted prior to conversion to its ASCII form by using DES (Data Encryption Standard) functions with a 56 bit key. DES is described in "Applied Cryptography; Protocols, Algorithms, and Source in C", by Bruce Schneier, 1994, John Wiley & Sons, Inc. The key will be non-obvious and known to the hub station 20 (that is, saved in a storage at hub station 20). The key will be provided to valid scanner sites when the key is changed allowing them to begin producing ID signals encrypted with the new key. This change may be required if an old key has been recognized by someone attempting to claim images which are not theirs. A change to the key will map to a new ID version and this association will be kept at hub station 20. The ID Version 102 facilitates the decryption process by associating the key used to encrypt a given ID Version with a non-encrypted portion of that ID. This will allow the ID to be decrypted and its component parts associated with a roll when it is loaded (that is, saved) by the hub station 20. The ID will result in an audit trail for all digital image sets loaded by the central hub station 20. This audit trail can be used by hub station 20 to respond to end user queries about the status of the digital image sets, as described below.

The ID will be presented to the user (such as by printing a hardcopy) as 16 case insensitive alphanumeric ASCII typeable characters (i.e. 10 byte binary ID represented in base 32 using 0–9 and Aa–Vv where 0=0, 1=1, . . . ,Aa=10, . . . ,Vv=31).

As can be seen from the above, the non-encrypted ID is incremented for each film roll received at a given scanner station. If nothing further was done to the ID, a malicious user at a remote terminal could simply increment a received ID and thereby access another's digital image set. However, due to the encryption of the ID as described above, the resulting encrypted identifications for a series of different film rolls sequentially scanned at the same location, no longer bear the same sequential relationship as the non-encrypted identifications. In fact, the encrypted indentification for one film roll in such a series cannot be determined from the encrypted identification of another roll, without knowledge of the encryption or decryption algorithm. The presence of the non-encrypted bit sum 100 (sometimes referenced as a "checksum") makes it even more difficult to falsify an ID.

Each processor-scanner station 2A to 2N further includes a first communication means to communicate each image set signal and its associated identification signal to the remote hub station 20, which is part of the image handling system. This communication is illustrated as communication link 10 in FIG. 1. The first communication means may be in the form of a modem (not shown) in scanner system 6, which communicates each image set signal and associated identification over a link 10 in the form of a connection to the hub station 20, such as telephone circuit connection 10a shown in FIG. 2. However, the first communication means could be a modem or communication card which communicates with hub station 20 over a different type of connection, such as a dedicated line connection or a network (such as the Internet). Of course, the various processor-scanner stations 2A to 2N in FIG. 1 may use different first communication means, and therefore the various links 10 shown in FIG. 1 may be the same, or a combination of connections or physical transfer links, one or more of which may be active at any given time (depending upon how many processor-scanner stations are communicating image set signals and associated identifications to hub station 20 at any given time). It will be appreciated that more than one processor-scanner station 2A to 2N may typically be in communication (such as by connection) with hub station 20 at any given time.

Alternatively, as shown in FIG. 2, the first communication means can be in the form of a tape storage in scanner system 6, which stores the digital image signal sets and associated identification signals on a data tape 54 which is physically transferred (as illustrated by physical transfer link 10b in FIG. 2) to hub station 20. In this case the link 10 is a corresponding physical transfer link 10b as shown in FIG. 2. It will be appreciated, of course, that tape 54 could be replaced by any other suitable data storage means, such as optical or magnetic disks.

The scanner system 6 at each processor-scanner station 2A to 2N, further includes a printer 8. Printer 8 is connected to scanner 6 so as to print out a hardcopy series of characters (shown as hardcopy identification 60 in FIG. 2) corresponding to each identification signal.

The single hub station 20 may particularly be a digital computer, such as a workstation, minicomputer or mainframe computer, suitably programmed to execute the steps of the method of the present invention required of hub station 20. Hub station 20 includes a second communication means to receive image set signals and their associated identification signals from each of the processor-scanner stations 2A to 2N. The second communication means may be a modem or suitable communication card (not shown) in the hub station for the case where any of processor-scanner stations 2A to 2N will connect by a link such as the telephone circuit connection 10a of FIG. 2, or may be a reading device (not shown) which can read a storage medium physically conveyed to hub station 20 when such a communication means is used by any of processor-scanner stations 2A to 2N. Of course, hub station 20 may have both such types of second communication means to accommodate the different types of communication means used by different processor-scanner stations 2A to 2N.

Hub station 20 further has a first storage device to store the received image set signals and their associated identification signals. Such storage device may be any suitable writeable magnetic or optical media (such as one or more hard disks or magnetic tape or optical disks or tape). A second storage, which may or may not be the same physical device as the first storage device, contains directory data correlating each scanner location identification with a scanner address (such as a conventional mailing address or electronic mail address).

Hub station 20 additionally has a third communication means for communicating stored image set signals to any of a plurality of terminals 40A, 40B, 40C to 40N connected to hub 20. Such connection is illustrated as connections 30 in FIG. 1, and may, for example, be a network connection, a dedicated data line connection, or telephone system connection. Preferably, one or more of the connections 30 will be network connections using the Internet. It will be appreciated that the second and third communication means can be the same physical element, such as a suitable communication program operating through a modem card with one or more telephone connections, when at least one of the processor-scanner stations 2A to 2N communicates with hub station 20 using a connection in the same manner as at least one remote terminal 40A to 40N. Each of remote terminals 40A to 40N may also be any digital computer with appropriate communication hardware and software to engage in two-way communication with hub station 20 over connections 30. The presence of such suitable hardware and software will be understood from each of the terminals 40A to 40N being "connected to communicate" with hub station 20. One or more remote terminals 40A may be connected to hub station 20 at any given time.

It will be appreciated that additional means for communicating image signals to hub station 20 can also be provided. For example, such additional means can include a digital camera which communicates a digital image to hub station 20, such as by a transmission over a network or telephone connection, or one or more scanner stations which do not have processors located at the same location.

Methods of the present invention which are executed on the system of FIGS. 1 and 2 will now be described. First, the user will deposit their undeveloped exposed film 48 at any one of the processor-scanner stations 2A to 2N which the user finds most convenient. The user will have previously identified on a magnetic layer of film 48, some or all of the images to be scanned and communicated to a hub station, as well as providing for such images an indication of the hub station address and a category identification, including user and album identification. The identification can be written on the film using a camera or other apparatus as mentioned above. At the selected processor-scanner station the user requests the type of processing and hardcopy images (for example, just negatives or additionally, reflective prints) desired and requests that an image set signal corresponding to the image set on film 48 be produced. These requests are made by checking appropriate boxes on a film processing envelope into which film 48 will be deposited, or can be magnetically recorded on film 48 to be read by reader 7 and further appropriate hardware/software. Film 48 will be processed (that is, chemically processed to yield a permanent image, which is sometimes references as "developing") to generate a corresponding negative set 52 and a corresponding print set 50. Different negative sets 52 from different corresponding films 48, will be batched together with negative sets from other orders requesting the scanning service, and images on the processed films carrying magnetic data indicating those images are to be scanned, will be scanned using high volume scanner system 6. As described earlier, each scanner system 6 will generate from each negative set 52, a corresponding digital image set signal and will also generate an associated identification signal for each image set signal. The identification signal includes a unique scanner location identification as discussed above, and in more detail below. The image set signal can be in any suitable format that will be acceptable to hub station 20, such as TIFF, JFIF, BMP, PICT, GIF, PhotoCD or particularly the recently announced FlashPix format. The identification signal will be associated with a corresponding image set signal, along with the corresponding hub station address identification and category identification.

A FlashPix file contains the complete image plus a hierarchy of several lower-resolution copies within the same file. This makes a FlashPix file function like a small file when users want it and like a big file when users need it. The FlashPix file structure employs Microsoft Corporation's OLE structured storage format, which holds image data and related descriptive information in a standardized "wrapper." The FlashPix format also records edits to an image as small scripts called "viewing parameters." Edits are applied to high-resolution images only when necessary—usually when users want high-quality output. The FlashPix format supports two clearly and completely defined color space options—a calibrated RGB color space definition and Photo YCC. The color space options are built directly into the file format. Optional JPEG compression, along with a single-color compression option where appropriate, is also provided. Further details of the FlashPix file format are available from Eastman Kodak Company, Rochester, N.Y..

Each print set 50, corresponding negative set 52, and associated identification, are forwarded to the end user (and hence, forwarded to a remote terminal when the user accesses such a remote terminal) by a route which is independent of hub station 20 (that is, this delivery to the end user does not go through hub station 20). Such independent routes 12 are indicated by lines in FIG. 1. In the case of the identification, this may consist simply of printing the identification associated with a given image set signal (and hence associated with the corresponding image set 52, 50 and film 48) with printer 8 and forwarding that printed identification with the associated hardcopy image sets 50, 52, to the user who deposited the associated film roll 48. This forwarding can simply be handing the print set 50, corresponding negative set 52 and associated printed identification 60 the user, or sending it to the user by some other means, such as conventional mail or courier. Alternatively, other routes independent of hub station 20 can be used as forwarding routes 12. For example, the identification could be communicated to the user by electronic mail, facsimile or some other means.

It is possible that, alternatively or additionally, the identification associated with a given film roll 48 could be communicated to the user through hub station 20, such as by an electronic communication (such as electronic mail through a connection such as the Internet). Such an electronic communication of the identification could simply be the same electronic communication of the identification communicated to hub station 20 along with the associated image set signal. Hub station 20 could then communicate the identification to a corresponding terminal 40A to 40N when the user communicates with (that is, logs onto) hub station 20. Such forwarding routes are indicated as forwarding routes 14. However, such a route is less desirable than routes 12 which are independent of hub station 20. This is because if hub station 20 does not receive the communicated image set signal and associated identification from the processor-scanner station at which the film roll 48 was scanned, the user does not have the identification available to her to use in determining why the associated image set signal is not available at hub station 20.

The digital image signal set corresponding to a customer's film roll 48, an associated identification signal, and the associated category identification, can be communicated from the processor-scanner station to hub station 20 at the address associated with the image set signal. The processor-scanner station preferably accomplishes this communication automatically (that is, without further operator intervention), particularly where the communication involves a transmission, based on the data recorded on film 48 indicating such communication is desired. This communication takes place by a connection 10a or a physical transfer link 10b of a signal storage medium such as a magnetic tape 54 as shown in FIG. 2 and discussed above. Hub station 20 receives each digital image set and its associated identification signal and category identification, communicated from each processor-scanner station 4A to 4N in the first storage means. The identification signal is decrypted and each image set signal and associated category identification can be stored in the first storage and indexed by the decrypted identification.

The user will be able to attempt to access the digital image set corresponding to film roll 48 as soon as they receive the identification, by using any remote terminal, such as remote terminal 40A to connect to and communicate with hub station 20 by a connection 30. At that time, the user simply enters the identification and over the connection successfully completes a user registration process at hub station 20. The identification will allow the user to inquire of hub system 20 as to the location and status of the digital image set signal corresponding to the identification (and film roll 48). Hub station 20 decrypts the identification entered by the user, and can search its index for a saved digital image of predetermined characteristics associated with the decrypted identification entered by the user. By "predetermined characteristics" in this case, is referenced any suitable predetermined characteristics determined by the operator of the system. For example, hub station 20 may be programmed such that any image set signal received will be stored and indexed with its associated identification signal. Alternatively, the "predetermined characteristics" could be programmed so that only a complete image set is so stored, or incomplete image sets (such as might result from an interruption of a connection between a processor-scanner station 4A to 4N and hub station 20, or from corrupted data) or digital image sets in a format not accepted by hub 20, may be stored but are identified as not meeting the predetermined characteristics (for example, they are stored with an associated identification indicating incomplete or corrupted data, or a data format not supported by hub station 20).

If such a digital image set of predetermined characteristics exists, one or more of the images in the set may be communicated to the user at remote terminal 40A, or forwarded to another of the connected remote terminals 40B to 40N, as instructed by the user. In the latter case, this would amount to the user forwarding one or more copies of the digital image as desired. The user may then edit or print the images as desired, and may further communicate the edited image back to hub station 20 for storage in addition to or instead of, the original unaltered digital image. For longer term storage of the original or altered image, the user may indicate by suitable input at his terminal that he wishes to accept the category identification assoicated with the image. In this case, the original or altered image would then be automatically stored by hub station 20 under that category (which may be one of multiple pre-identified categories stored by hub station 20) without the user having to do anything further. The user may alternatively indicate some other category identification if desired.

Furthermore, hub station 20 could be programmed to transmit to the user at a remote terminal, either upon request or automatically (in the form of advertising), details of services that can be requested from hub station 20. Such services may include various sized prints of an original or edited image stored at hub station 20 (either as prints by themselves, or with accompanying text or graphics, such as embodying the image in a greeting card), or the incorporation of one or more original or edited images onto a product, such as an article of clothing or other useful articles (for example, cups or plates). For this purpose, hub station 20 may communicate (preferably by transmission) the image signal and accompanying instructions, text, and/or graphics, to one or more printers (not shown) or other locations (not shown) at which the user's request may be fulfilled. Such printers or other locations may or may not be remote from hub station 20.

As mentioned digital image data may be lost in transit from a processor-scanner station to hub station 20, an error may occur during the loading of the digital image data to the hub station 20, the image quality may be poor, or some other problem may result in hub station 20 not storing the digital image set associated with the identification entered by the user.

If a digital image set of predetermined characteristics is not stored at hub station 20, different procedures can be used to inquire as to the whereabouts of such digital image set. For example, the date indication of the identification entered by the user can be compared with the current date. If the difference between the date identification of the entered identification and the current date is less than a tolerance predetermined by the user (for example, less than 5 days), hub station 20 may communicate a second message to the user at the remote terminal 40A stating that insufficient time has been allowed for receipt of the scanned image set, and to check again later. Additionally, hub station 20 could indicate to the user upon such an inquiry that an electronic mail message will be sent from hub station 20 to the electronic mail address of terminal 40A within an additional predetermined number of days (for example 10) when a digital image set associated with that identification is received at hub station 20, or by the end of that additional predetermined period if no such digital image set is received. Hub station 20 can then index the additional predetermined date and automatically send the foregoing messages when, or if no, digital image set associated with the identification is received at hub station 20 by the predetermined date.

If the difference between the two dates exceeds the predetermined tolerance, hub station 20 can then determine from the directory database in the second storage, the scanner address associated with the user entered identification. In the particular example above, this would be scanner 2A. Hub station 20 can then forward a first message in the form of an inquiry to the determined scanner address to inquire as to the particulars of the communication of the digital image set associated with that identification, or in the form of a request to repeat the communication if possible (for example, where the determined processor-scanner station has stored a copy of the digital image set). Hub station 20 can connect to the determined processor-scanner station 2A to deliver the first message as, for example, be an electronic mail message or facsimile, if the processor-scanner station has the capacity to receive such a message. In the case of the electronic message in particular, the processor-scanner stations 2A to 2N may optionally be equipped with a storage which stores particulars of when and how each digital image set and associated identification was communicated to hub station 20. In this case, a processor-scanner station to which an inquiry was sent, could access such particulars of digital image set status and disposition in response to the inquiry, and communicate them to hub station 20 through a connection, for communication to a connected terminal 40A to 40N. Alternatively, the first message can be printed at hub station 20 and forwarded by conventional mail or courier to the determined processor-scanner station such as processor-scanner station 2A.

Of course, the sequences in the foregoing paragraph can optionally be executed upon receipt of a user inquiry, without the described comparing of the difference in the two dates.

It will be appreciated from the above, that the end user is able to drop off multiple film rolls at different ones of the processor-scanner stations 2A to 2N and access the corresponding digital image sets, without ever having to keep track of which film rolls were dropped off at which processor-scanner stations, and accesses all scanned image sets at the one hub station 20. Furthermore, the unique scanner location identification aids in tracing a digital image set if for any reason it is not available from hub station 20 by the user.

Figure 4:
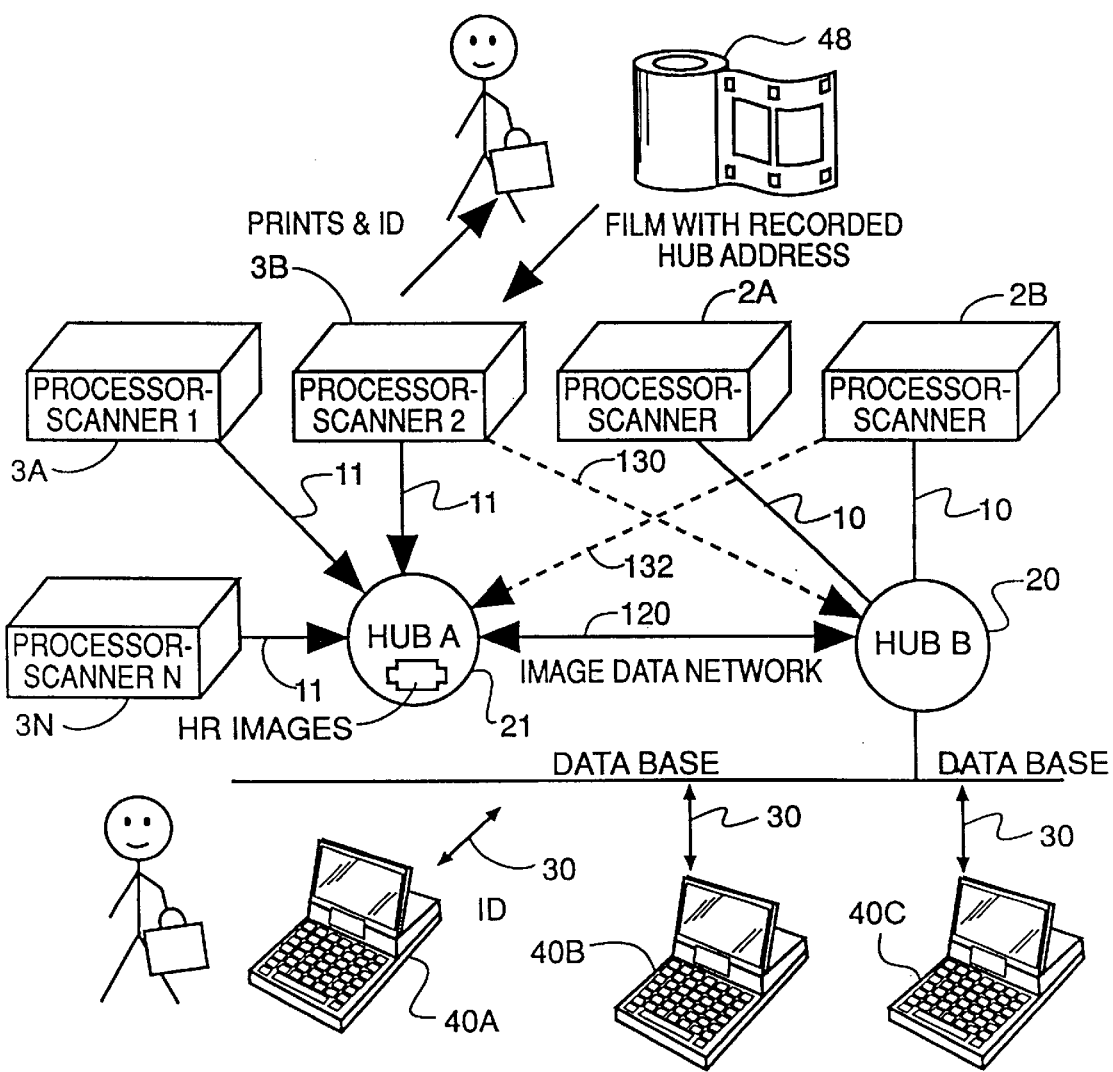
FIG. 4 is a block diagram illustrating a system of FIG. 1 with a further connection of the hub to another hub.

Referring to FIG. 4, there is illustrated the situation where more than one hub station is present in the overall system, each hub serving different geographical regions (such as different countries or different sub-regions within a country, such as one or more postal zip code areas). In FIG. 4, hub station 20 is only shown with processor-scanner stations 2A and 2B communicating therewith, although it will be understood that further processor-scanner stations 2C to 2N can be present. A second hub station 21, which may be the same as hub station 20, is in communication with processor-scanner stations 3A, 3B to 3N over communication links 11, in any of the manners hub station 20 may be in communication with processor-scanner stations 2A to 2N, as described above. A plurality of user terminals (not shown) may further be connected to hub station 21. There may, of course, be a further connections of hub station 20 to other hub stations (not shown) each with their own associated processor-scanner stations and terminals (not shown). Hub station 20 may communicate with each over a data network or other connection, such as hub station 20 communicates with hub station 21 over image data network 120. Although communications involving physical transfers can be used between hub stations, this is less preferred than communications involving transmission over connections. The communication connection from one hub station to hub station 20 can be through one or more other hub stations or not.

In one method executed by the system of FIG. 4, each of the multiple hub stations (such as hub station 20 and 21) would have directory data in their respective second storages. This directory data correlates each scanner location identification with a scanner address and the address of the hub with which that processor-scanner station normally communicates. With this arrangement, a user can drop off film 48 for processing and scanning at any processor-scanner station which normally communicates with an associated hub, and automatically retrieve digital images at any terminal by communicating at another hub. As particularly shown in FIG. 4, the user drops off a film for processing and scanning at processor-scanner station 3B. The print set and associated unique identification are returned to the user. Processor-scanner station will communicate the digital image set of that film to hub station 21, with which it is normally associated. When the user attempts to retrieve the digital image set from a terminal 40A connected to hub station 20, hub station 20 will compare the decrypted identification transmitted to it by the user with its directory data and ascertains that the film associated with that identification was scanned at processor-scanner station 3B, which processor-scanner station normally communicates with hub station 21. Hub station 20 will then forward a request to hub station 21 (preferably a transmitted request over image data network 120) for the associated digital image set to be communicated to hub 20. Preferably this communication occurs also as a transmission from hub 21 to hub 20. In this example then, it will be seen that the communication from processor-scanner station 3B to hub station 20, was an indirect communication through hub station 21.

In another method which can be executed by the system of FIG. 4, an indication of the hub station address, as discussed above, has been recorded on the magnetic layer of film 48 by the user using a camera or other apparatus as mentioned above. In this case, processor-scanner station 3B may be programmed to automatically communicate image signal sets and associated data to the hub station so identified. For example, if the magnetically recorded data on film 48 provides an indication of the address of hub station 21, processor-scanner station 3B can automatically communicate an image set signal corresponding to one or more images on film 48, to hub station 21 through communication link 11. Alternatively, if the data on film 48 provides an indication of the address of hub station 20, processor-scanner station 3B can either directly communicate the image set signal to hub station 20 through a communication link 130, or may indirectly do so by communicating the image set signal first to hub station 21 through link 11 along with the address indication of hub station 20. Hub station 21 may then be programmed to forward the image set signal over image data network 120 to hub station 20. Similarly, other image set signals obtained at other processor-scanner stations can be communicated directly or indirectly to other hub stations than that with which a particular process-scanner is normally associated. For example, processor-scanner 2A can communicate directly through communication link 132 with hub station 21, or indirectly with it through links 10 and 120.

Note that in the above situation where the film 48 provides an indication of a hub station address, communicating indirectly with the indicated hub station can be advantageous where the hub station address identification is an indirect one. In particular, as discussed above, if the hub station address indication is an indirect indication (such as customer's address or postal code), then direct communication from a processor-scanner station requires a database at that processor-scanner station in order to obtain the necessary direct address from the indirect address. This requires that a current version of the database be maintained at each processor-scanner station. On the other hand, if the processor-scanner station simply communicates the image set signal and the associated indirect hub station address to the hub station with which it is normally associated with, the current database need reside only in the hub stations. Since the hub stations preferably communicate by image data network 120 which are typically high capacity transmission connections, and there are far fewer hub stations than scanner stations, it is a simple matter for each hub station to be provided with a current version of the necessary database.

Figure 5:
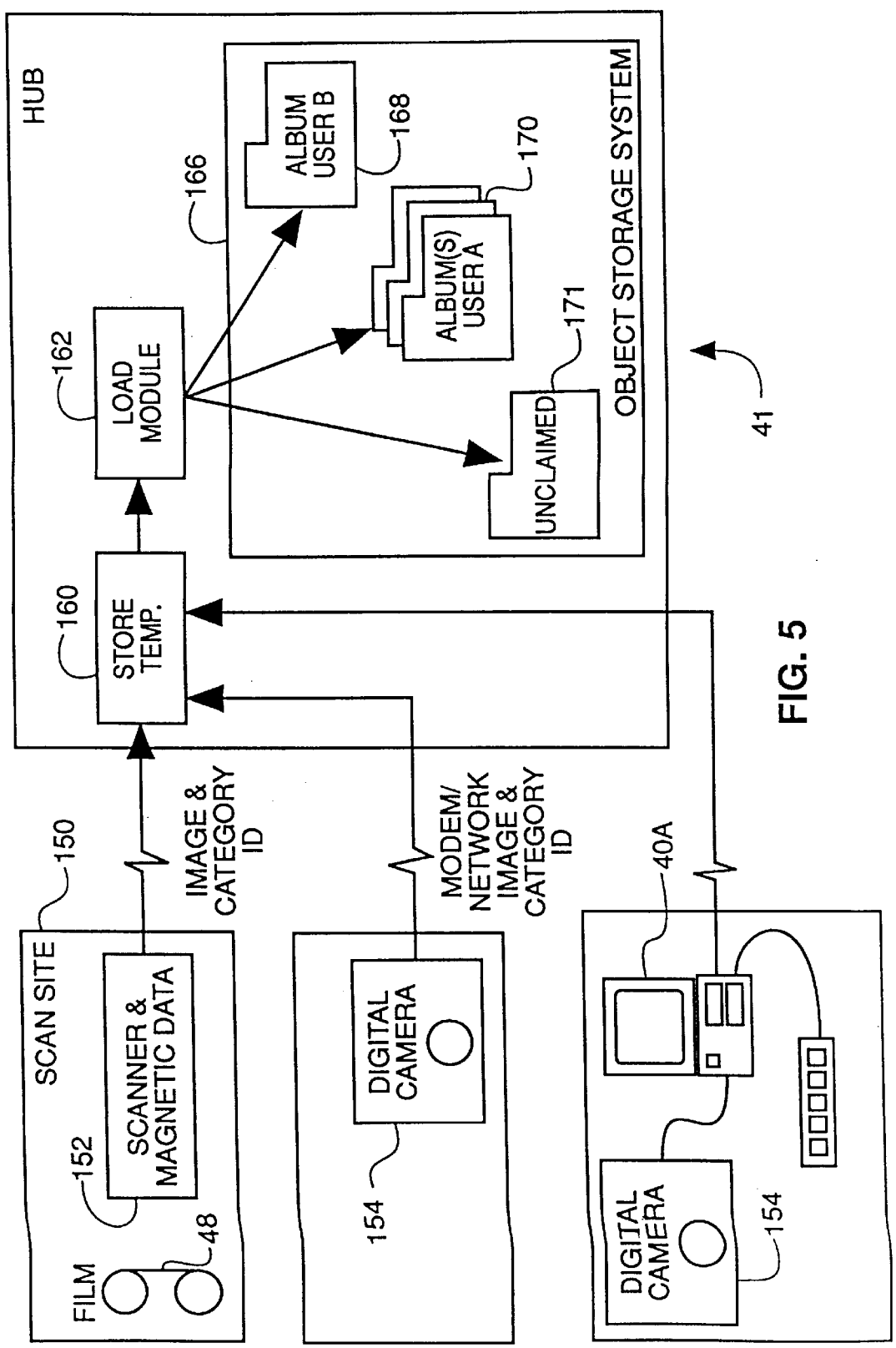
FIG. 5 is a block diagram illustrating another system of the present invention.

In the system illustrated in FIG. 5 image data and category data can be obtained at a scan site 150. Scan site 150 includes a scanner which generates an image set signal in accordance with the image set on a film 48. Scan site 150 also includes a magnetic reader which can read category identification data from a magnetic layer on film 48. The scanner and magnetic reader are contained in unit 152. Alternatively the image set signal and category data can be obtained from a digital camera 154 (specifically from a memory housed in camera 154), or from a computer 40A connected to a digital camera (such as at a user's home PC, or a commercial copy/print station, for example the KODAK IMAGE MAGIC PRINT SYSTEM available from Eastman Kodak, Rochester, N.Y.). The data (that is, the image set signal and category data) can then be communicated to a remote second location in the form of hub 41, through a private or public communication channel such as the Internet using a modem or other suitable hardware (not shown).

Image data and category data received at hub 41 are stored in temporary storage 160. A load module 162 reads the image and category data from temporary storage 160 and loads the image data into different categories 168, 170, or 171 in an object storage system 166, as determined by the category data assoicated with the image set signal. It will be appreciated that categories 168, 170, 171 are not physical categories, but simply represent groups of images which are associated into respective categories as determined by object storage system 166 (e.g. Album User B 168 represents images associated with user B by object storage system 166, such as under a directory entitled "B"). Images could be accessed from hub 41 at remote terminals in a manner the same as described above in connection with other embodiments of the invention.

The invention has been described with reference to a preferred embodiment. However, it will be appreciated that variations and modifications can be effected by a person of ordinary skill in the art without departing from the scope of the invention.

PARTS LIST

| | |
|---|---|
| 2A, 2B, 2C to 2N | Processor-Scanner Station |
| 3A, 3B to 3N | Processor-Scanner Stations |
| 4 | Film Processor |
| 6 | Scanner System |
| 7 | Data Reader |
| 8 | Printer |
| 10, 11, 130 | Communication Links |
| 10a | Connection |
| 10b | Transfer Link |
| 12, 14 | Routes |
| 20 | Hub Stations |
| 30 | Connections |
| 40A, 40B, 40C to 40N | Terminals |
| 41 | Hub |
| 42 | Digital Computer |
| 48 | Film Roll |
| 50 | Print Set |
| 52 | Negative Set |
| 54 | Tape |
| 60 | Identification |
| 100 | Bit Sum |
| 102 | ID Version |
| 104 | Scanner ID |
| 106 | Date Code |
| 108 | Sequence Number |
| 120 | Network |
| 132 | Communication Link |
| 150 | Scan Site |
| 152 | Unit |
| 154 | Camera |
| 160 | Temporary Storage |
| 168 | Album User B Category |

-continued

PARTS LIST

| | |
|---|---|
| 162 | Module |
| 166 | Storage System |
| 170, 171 | Categories |

We claim:

1. An image handling method comprising the steps of:
   (a) processing an exposed photographic film at a processor-scanner station, which has both a scanner and a processor at the same location, to produce one or more hardcopy images at the processor-scanner location;
   (b) reading data on the film which indicates a predetermined set of images that is to be communicated to a hub station, which hub station is remote from the processor-scanner station;
   (c) scanning the predetermined set of images at the same processor-scanner location at which the film was processed, to obtain a corresponding image set signal;
   (d) communicating the image set signal from the scanner to the hub station, wherein communication is by transmitting the image set signal from the scanner-processor location to the hub station; and
   (e) storing the communicated image set signal at the hub station wherein the hub station can store associated image set signals according to any of a plurality of identified categories, the data read on the film additionally includes a category identification that indicates in which category the scanned and communicated image set signal is to be stored, the image set signal is communicated with the category identification, and wherein the hub station stores the image set signal according to the category identification communicated and wherein each category includes a plurality of identified user categories and a plurality of identified album categories within each user category, and wherein the category identification read on the film includes both a user identification and an album identification.

2. A method according to claim 1 wherein the data read from the film contains an indication of the hub station's address.

3. A method according to claim 2, additionally comprising transmitting the image set signal to a terminal remote from the hub station and the processor-scanner station.

4. A method according to claim 1 wherein the data on the film is stored in a magnetic layer.

5. A method according to claim 2, wherein:
   a plurality of photographic films are processed at the same processor-scanner station, to produce respective images at the processor-scanner location;
   data is read on the film which indicates that respective hardcopy image sets are to be communicated to different hub stations identified in the data from respective films, each of which hub stations is remote from the processor-scanner station;
   scanning the image sets at the same processor-scanner location at which the films were processed, to obtain respective image set signals;
   communicating the image set signals from the scanner to the different hub stations identified from data read on the film;

storing the communicated image set signals at the respective hub stations; and transmitting the image set signals from the hub stations to different terminals remote from the hub stations and the processor-scanner station.

6. An image handling method, comprising the steps of:
(a) processing exposed photographic film at each of a plurality of processor-scanner stations which are remote from one another, each processor-scanner station having both a scanner and a processor at each of the processor-scanner locations to produce one or more hardcopy images;
(b) reading data on film which indicates that a predetermined set of images which is to be communicated from the processor-scanner station at which the film is processed, to a remote hub station identified from data read on the film, which hub station is remote from each processor-scanner station, wherein the data on the film includes a plurality of identified user categories and a plurality of identified album categories within each user category, and wherein the category identification read on the film includes both a user identification and an album identification;
(c) scanning film at the same processor-scanner location at which the corresponding film was processed, to obtain a corresponding image set signal of the predetermined set;
(d) communicating each image set signal from the same processor-scanner to the hub station by transmitting the image set signal;
(e) storing the communicated image set signals at the hub station; and
(f) transmitting each stored image set signal to the same or different terminals, each of which is remote from the hub station and the corresponding processor-scanner station at which the image set signal was obtained transmitting each stored image set signal to the same or different terminals, each of which is remote from the hub station and the corresponding processor-scanner station at which the image set signal was obtained.

7. A method according to claim 6, additionally comprising transmitting each stored image set signal to the same or different terminals, each of which is remote from the hub station and the corresponding processor-scanner station at which the image set signal was obtained.

8. A method according to claim 7 wherein the hub station can store associated image set signals in any of a plurality of identified categories, the data read on the film additionally includes a category identification that indicates in which category the scanned and communicated image set signal is to be stored, the image set signal is communicated with the category identification, and wherein the hub station stores the image set signal according to the category identification communicated.

9. An image handling method, comprising the steps of:
(a) reading, at a first station, an image set signal which is a digital electronic version representing a set of one or more images which are to be communicated to a remote second station, and obtaining at the first station category identification data associated with the image set signal which indicates in which category the image set signal is to be stored;
(b) communicating the image set signal and associated category identification from the first station to the second station by transmitting the digital electronic image signal set; and
(c) storing the communicated image set signal at the second station in a category determined by the category identification, the category identification being selected from either a previously existing one or one created by the second station, wherein the second station can store image set signals in any of a plurality of identified categories previously existing at the second station, and wherein the communicated category identification identifies one of the previously stored identified categories.

10. A method according to claim 9 wherein the category includes a user category and an album category within the user category.

11. A method according to claim 9 wherein image set signal and category identification are read from a digital camera.

12. A method according to claim 9 wherein the image set signal is obtained from scanning an image on a photographic film, and the category identification is read from magnetically encoded data on the film.

* * * * *